(12) United States Patent
Nonaka et al.

(10) Patent No.: US 10,165,242 B2
(45) Date of Patent: Dec. 25, 2018

(54) IMAGE-CAPTURING METHOD AND IMAGE-CAPTURING DEVICE

(71) Applicant: Hitachi Industry & Control Solutions, Ltd., Hitachi-shi, Ibaraki (JP)

(72) Inventors: Yuuichi Nonaka, Tokyo (JP); Shinichiro Hirooka, Tokyo (JP)

(73) Assignee: Hitachi Industry & Control Solutions, Ltd., Hitachi-shi (JP)

( * ) Notice: Subject to any disclaimer, the term of this patent is extended or adjusted under 35 U.S.C. 154(b) by 432 days.

(21) Appl. No.: 14/806,002

(22) Filed: Jul. 22, 2015

(65) Prior Publication Data

US 2016/0065926 A1 Mar. 3, 2016

(30) Foreign Application Priority Data

Aug. 29, 2014 (JP) .................................. 2014-174754

(51) Int. Cl.
*H04N 9/73* (2006.01)
*H04N 5/33* (2006.01)
(Continued)

(52) U.S. Cl.
CPC ........... *H04N 9/735* (2013.01); *H04N 5/2351* (2013.01); *H04N 5/2354* (2013.01); *H04N 5/33* (2013.01);
(Continued)

(58) Field of Classification Search
CPC ...... H04N 9/735; H04N 9/045; H04N 5/2351; H04N 5/2354; H04N 5/33; H04N 5/335;
(Continued)

(56) References Cited

U.S. PATENT DOCUMENTS 8,767,074 B2 7/2014 Kim et al.
9,699,429 B2 * 7/2017 Kaizu .................... H04N 9/735
(Continued)

FOREIGN PATENT DOCUMENTS

JP 2010-161459 A 7/2010
JP 2011-233983 A 11/2011
WO WO 2013/118337 A1 8/2013

OTHER PUBLICATIONS

Tanaka, WO 2011001672 A1 English Translation.*
Extended European Search Report issued in counterpart European Application No. 15181950.5 dated Mar. 30, 2016 (six (6) pages).

*Primary Examiner* — Joseph G Ustaris
*Assistant Examiner* — Jill D Sechser
(74) *Attorney, Agent, or Firm* — Crowell & Moring LLP

(57) ABSTRACT

Provided is an image-capturing device including: a visible light signal generating unit that extracts a visible light signal from a pixel signal from an image-capturing element; a light source color estimating unit that estimates a color temperature of a light source from the visible light signal; a white-balance adjusting unit that performs white balance correction on the visible light signal according to an estimation result; a non-visible light signal generating unit that extracts a non-visible light signal from the signals from the image-capturing element; and an image composing unit that combines and outputs the visible light signal on which the white balance correction was performed and the non-visible light signal.

8 Claims, 11 Drawing Sheets

(51) Int. Cl.
  *H04N 5/235*   (2006.01)
  *H04N 5/335*   (2011.01)
  *H04N 9/04*    (2006.01)

(52) U.S. Cl.
  CPC ............ *H04N 5/332* (2013.01); *H04N 5/335* (2013.01); *H04N 9/045* (2013.01); *H04N 9/73* (2013.01); *H04N 2209/046* (2013.01); *H04N 2209/047* (2013.01)

(58) Field of Classification Search
  CPC .... H04N 9/73; H04N 5/332; H04N 2209/046; H04N 2209/047
  See application file for complete search history.

(56) References Cited

U.S. PATENT DOCUMENTS

| | | | |
|---|---|---|---|
| 2008/0199074 A1* | 8/2008 | Mitsunaga | H04N 5/20 382/169 |
| 2009/0079834 A1* | 3/2009 | Otsu | H04N 5/33 348/169 |
| 2009/0141974 A1* | 6/2009 | Ono | G06K 9/4652 382/165 |
| 2010/0238317 A1* | 9/2010 | Takeo | H04N 9/73 348/223.1 |
| 2013/0002882 A1 | 1/2013 | Onozawa et al. | |
| 2013/0093929 A1* | 4/2013 | Kouyama | H04N 9/735 348/273 |
| 2014/0098265 A1* | 4/2014 | Hosaka | H04N 1/58 348/246 |
| 2014/0320695 A1* | 10/2014 | Ozawa | H04N 5/35563 348/229.1 |
| 2015/0256800 A1* | 9/2015 | Sugiyama | H04N 9/045 348/279 |

\* cited by examiner

FIG. 8

| RIR | GIR | RIR | GIR |
|-----|-----|-----|-----|
| NIR | BIR | NIR | BIR |
| RIR | GIR | RIR | GIR |
| NIR | BIR | NIR | BIR |
| RIR | GIR | RIR | GIR |
| NIR | BIR | NIR | BIR |

FIG. 9

| RIR | GIR | RIR | GIR |
|-----|-----|-----|-----|
| WIR | BIR | WIR | BIR |
| RIR | GIR | RIR | GIR |
| WIR | BIR | WIR | BIR |
| RIR | GIR | RIR | GIR |
| WIR | BIR | WIR | BIR |

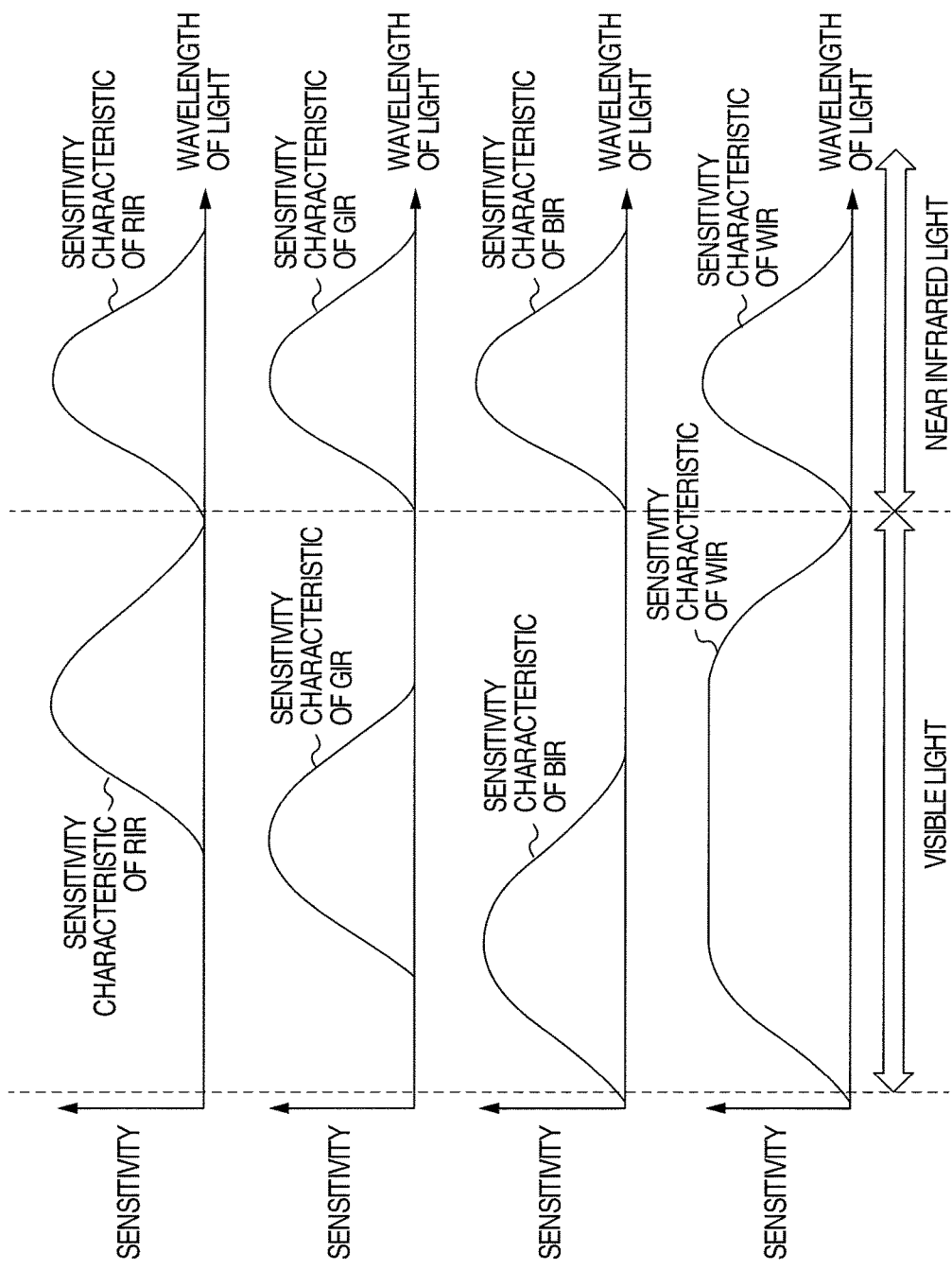

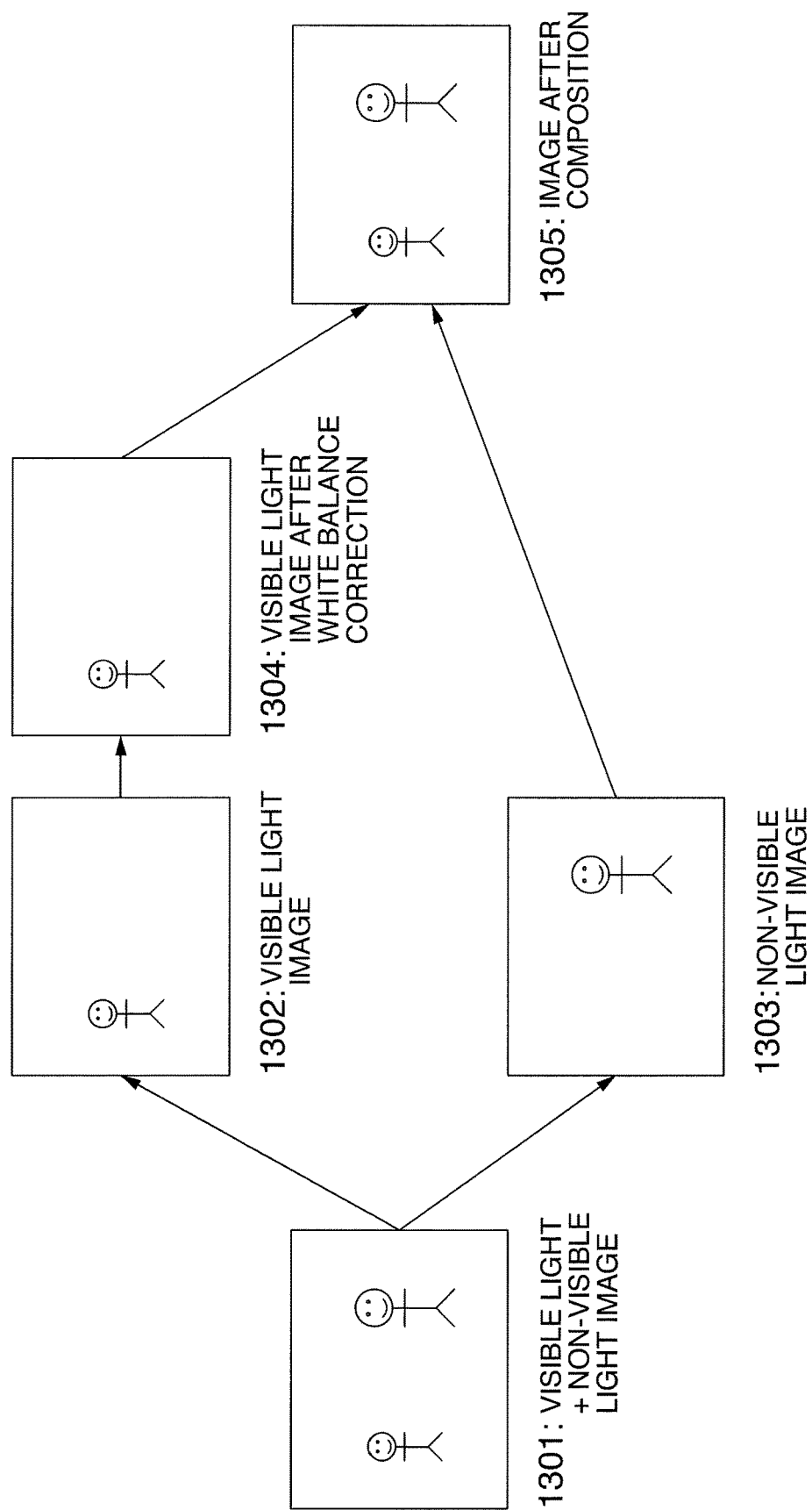

IMAGE-CAPTURING METHOD AND IMAGE-CAPTURING DEVICE

BACKGROUND OF THE INVENTION

The present invention relates to an image-capturing method and an image-capturing device.

As a background of the field of the present invention, there is JP-A-2010-161459. In the above patent application publication, it is stated that "PROBLEM TO BE SOLVED: To provide an infrared radiation imaging device capable of adjusting a composite ratio of a visible light component and an infrared component when imaging is executed under low illuminance. SOLUTION: In executing imaging under an infrared radiation imaging condition, an infrared combined imaging device processes white balance per color of an imaging signal generated under visible light imaging condition in which an infrared cut filter is inserted into an optical path, and generates a white-balanced imaging signal. The imaging device separates an imaging signal generated under the infrared radiation condition into a visible light component signal and an infrared component imaging signal, generates a visible light luminance signal and a chroma image signal from the visible light component imaging signal, and generates an infrared luminance signal from the infrared component imaging signal. The imaging device adjusts the composite ratio of the visible light luminance signal and the infrared luminance signal to generate a luminance image signal."

Also, there is JP-A-2011-233983. In this patent application publication, it is stated that "PROBLEM TO BE SOLVED: To provide an imaging apparatus capable of obtaining a good color image even under low illuminance, such as in the night time or the like, and simultaneously obtaining a video with a brilliant contrast as in the case where an infrared illumination apparatus is used. SOLUTION: An imaging apparatus has: a solid-state imaging element 10; an infrared LED 70 that emits infrared light; a light-emission controller 60 that makes the infrared LED 70 carry out pulse emission of infrared light in the unit of frame time; and a signal processor 20 that respectively extracts a color image signal in the visible light and an image signal in the infrared light from the solid-state imaging element 10 in synchronization with non-light-emission period and light-emission period of the infrared LED 70. The solid-state imaging element 10 has an imaging region in which unit arrays, each having a picture element for receiving green visible light and infrared light, a picture element for receiving red visible light and infrared light, a picture element for receiving blue visible light and infrared light, and a picture element for receiving infrared light, are arranged in a matrix."

SUMMARY OF THE INVENTION

In the invention disclosed in JP-A-2010-161459, it is necessary to acquire image-capturing signals under the visible light image-capturing condition and the infrared radiation image-capturing condition, respectively. In addition, the case in which there occurs change of an amount of light on a time base in an image-capturing environment such as flickering of a fluorescent lamp, pulse radiation of an LED illumination, and blinking light is not considered.

In the invention disclosed in JP-A-2011-233983, it is necessary to control the infrared LED. In addition, an image-capturing environment in which illumination light including infrared light such as solar light and halogen light exists is not considered.

Configurations described in the claims are adopted to resolve the above technical problems in the related art.

A plurality of means that achieve the above-described objects are included in the present application; according to one example, there is provided an image-capturing device including: an image-capturing element that executes photo-electric conversion on light including visible light and non-visible light and outputs a pixel signal; a visible light signal generating unit that extracts and outputs a visible light signal from the pixel signal from the image-capturing element; a light source color estimating unit that estimates a color temperature of a light source from the visible light signal from the visible light signal generating unit and outputs an estimation result; a white-balance adjusting unit that performs white balance correction on and outputs the visible light signal from the visible light signal generating unit according to the estimation result from the light source color estimating unit; a non-visible light signal generating unit that extracts and outputs a non-visible light signal from the pixel signal from the image-capturing element; and an image composing unit that combines and outputs the visible light signal subjected to white balance correction in the white-balance adjusting unit and the non-visible light signal from the non-visible light signal generating unit.

According to the present invention, visible light and non-visible light components from an object can be acquired as one combined image while the problems in the related art are resolved, and further a color balance thereof can be appropriately corrected. Other detailed advantages will be described with embodiments.

BRIEF DESCRIPTION OF THE DRAWINGS

FIG. 8 illustrates an example of a pixel array of an image-capturing element of an embodiment according to the present invention;

FIG. 9 illustrates an example of a pixel array of an image-capturing element of an embodiment according to the present invention;

FIG. 11 illustrates an example of spectral sensitivity characteristics of an image-capturing element of an embodiment according to the present invention; and FIG. 12 illustrates an example of an acquired image of an embodiment according to the present invention.

DESCRIPTION OF THE EMBODIMENTS

Embodiment 1

Figure 1:
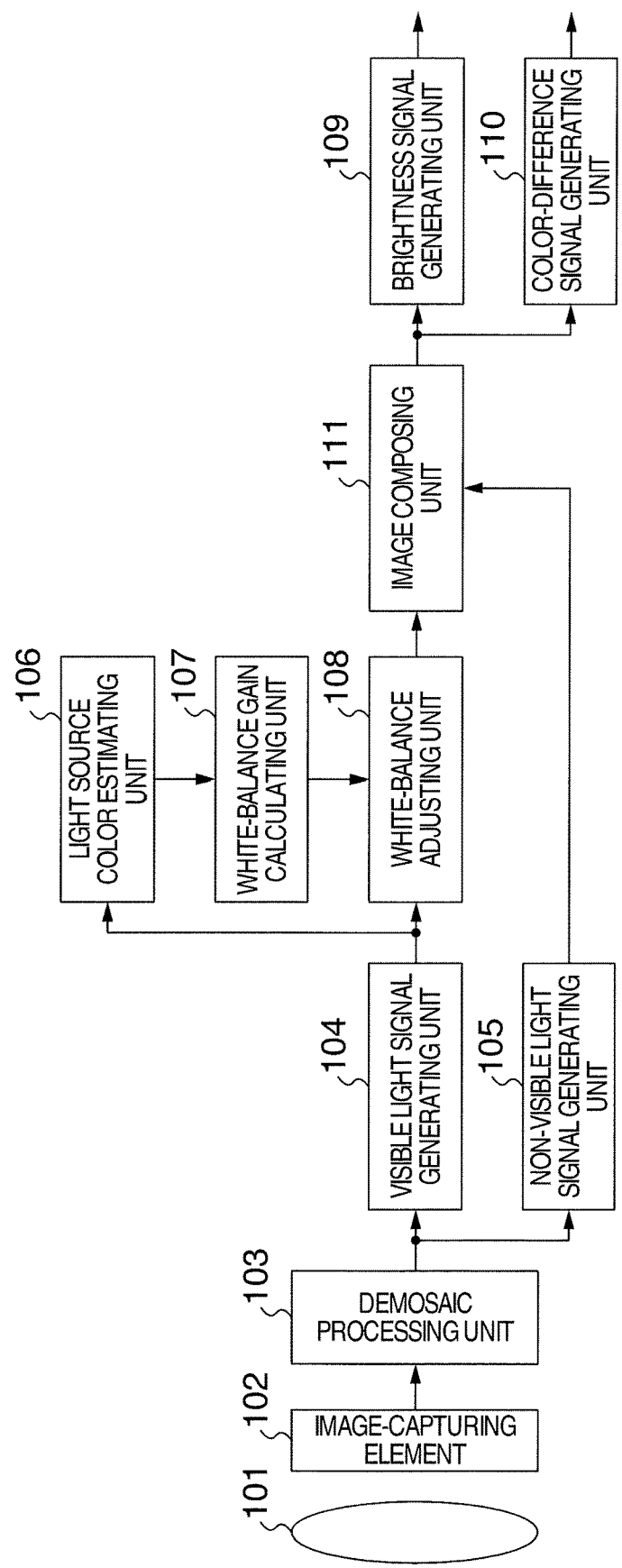
FIG. 1 illustrates an overall configuration diagram of an embodiment according to the present invention.

FIG. 1 is a diagram illustrating an example of an embodiment according to the present invention.

An image-capturing device of this embodiment includes: a lens 101 that focuses visible light/non-visible light from an object at a prescribed focal distance; an image-capturing element 102 that disperses the visible light/non-visible light focused by the lens 101 with various color filters, executes photoelectric conversion, and outputs a plurality of pixel signals corresponding to prescribed wavelength components; a demosaic processing unit 103 that executes demosaic processing on the pixel signals from the image-capturing element 102; a visible light signal generating unit 104 that executes operation processing on the pixel signals output from the demosaic processing unit 103 and extracts pixel signals for visible light components (visible light signals); a non-visible light signal generating unit 105 that executes operation processing on the pixel signals output from the demosaic processing unit 103 and extracts pixel signals for a non-visible light component (non-visible light signals); a light source color estimating unit 106 that estimates light source colors from the pixel signals from the visible light signal generating unit 104; a white-balance gain calculating unit 107 that calculates gain to perform white balance correction on the visible light signals which is an output of the visible light signal generating unit 104, based on a result of the light source color estimating unit 106; a white-balance adjusting unit 108 that performs white balance correction on the visible light signals output from the visible light signal generating unit 104, based on gain information from the white-balance gain calculating unit 107; an image composing unit 111 that combines the visible light signals on which white balance correction has been performed by the white-balance adjusting unit 108 and the non-visible light signals output from the non-visible light signal generating unit; a brightness signal generating unit 109 that generates brightness signals using pixel signals after composition output from the image composing unit 111; and a color-difference signal generating unit 110 that generates color-difference signals using the pixel signals after composition output from the image composing unit 111.

Figure 10:
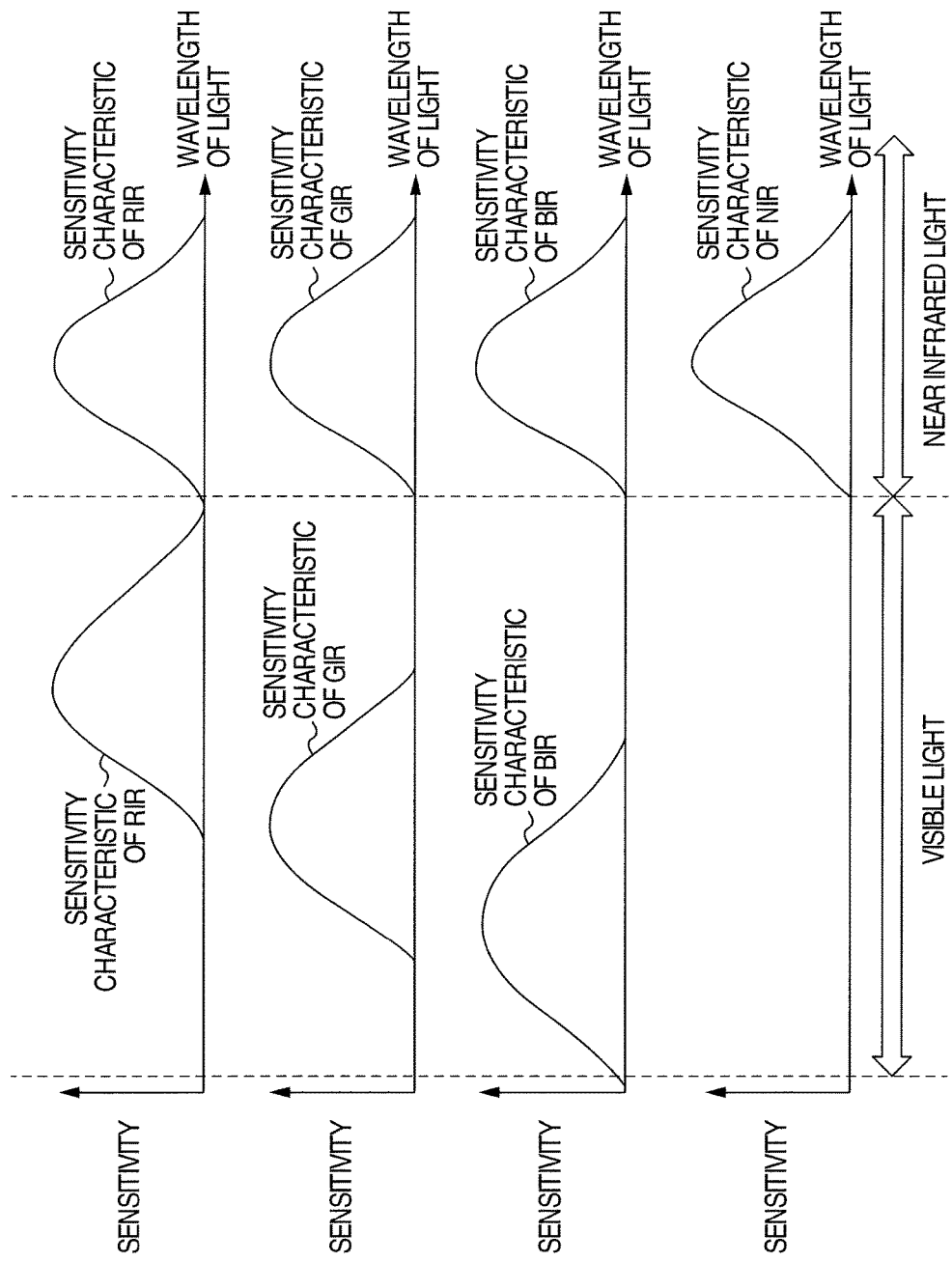
FIG. 10 illustrates an example of spectral sensitivity characteristics of an image-capturing element of an embodiment according to the present invention.

First, a method of acquiring individual signals of visible light components R, G, and B and a non-visible light component IR at the same time is described. FIG. 8 illustrates an example of a color filter array of the image-capturing element 102 in this embodiment. R+IR (RIR), G+IR (GIR), B+IR (BIR), and IR (NIR) represent pixels in which four types of different color filters are arranged, respectively. FIG. 10 illustrates an example of spectral sensitivity characteristics of the pixels in which the four types of color filters are arranged. For example, pixels to which a color filter for RIR is arranged are to have sensitivity around wavelengths of red (R) of visible light and around wavelengths of near infrared light (IR), pixels to which a color filter for GIR is arranged are to have sensitivity around wavelengths of green (G) of the visible light and around wavelengths of near infrared light (IR), pixels to which a color filter for BIR is arranged are to have sensitivity around wavelengths of blue (B) of the visible light and around wavelengths of near infrared light (IR), and pixels to which a color filter for NIR is arranged are to have sensitivity around wavelengths of near infrared light (IR).

The demosaic processing unit 103 executes demosaic processing on output image signals of the image-capturing element 102 in which the different color filters are arranged, by interpolation processing and the like. In the interpolation processing, for example, because GIR, BIR, and NIR pixels do not exist at a pixel position of an RIR pixel, interpolated signals are generated from adjacent pixels of the same color by the interpolation processing and are output.

The visible light signal generating unit 104 executes matrix operations or the like on the pixel signals output from the demosaic processing unit 103, generates visible light signals, and outputs them. In addition, the non-visible light signal generating unit 105 executes matrix operations or the like on the pixel signals output from the demosaic processing unit 103, generates non-visible light signals, and outputs them. For example, the visible light signal generating unit 104 generates individual signals of R, G, and B as visible light signals, which do not include non-visible light or of which signal amounts are attenuated to prescribed amounts, by operation processing of the following expressions (1) to (3), and the non-visible light signal generating unit 105 generates IR signals as non-visible light signals, which do not include visible light components or of which signal amounts are attenuated to prescribed amounts, by operation processing of the following expression (4).

$$R = \alpha_{rr} \times RIR + \alpha_{rg} \times GIR + \alpha_{rb} \times BIR + \alpha_{ri} \times NIR \quad (1),$$

$$G = \alpha_{gr} \times RIR + \alpha_{gg} \times GIR + \alpha_{gb} \times BIR + \alpha_{gi} \times NIR \quad (2),$$

$$B = \alpha_{br} \times RIR + \alpha_{bg} \times GIR + \alpha_{bb} \times BIR + \alpha_{bi} \times NIR \quad (3),$$

$$IR = \alpha_{ir} \times RIR + \alpha_{ig} \times GIR + \alpha_{ib} \times BIR + \alpha_{ii} \times NIR \quad (4).$$

Here, each $\alpha$ represents a coefficient for each signal and, when the following expression (5) is given for the coefficients of $\alpha$, for example, $$\begin{pmatrix} \alpha_{rr} & \alpha_{rg} & \alpha_{rb} & \alpha_{ri} \\ \alpha_{gr} & \alpha_{gg} & \alpha_{gb} & \alpha_{gi} \\ \alpha_{br} & \alpha_{bg} & \alpha_{bb} & \alpha_{bi} \\ \alpha_{ir} & \alpha_{ig} & \alpha_{ib} & \alpha_{ii} \end{pmatrix} = \begin{pmatrix} 1 & 0 & 0 & -1 \\ 0 & 1 & 0 & -1 \\ 0 & 0 & 1 & -1 \\ 0 & 0 & 0 & 1 \end{pmatrix}, \quad (5)$$

the expressions (1) to (4) become the following expressions (6) to (9):

$$R = RIR - NIR \quad (6),$$

$$G = GIR - NIR \quad (7),$$

$$B = BIR - NIR \quad (8),$$

$$IR = NIR \quad (9).$$

As illustrated in FIG. 10, if the amount of a non-visible light component included in an RIR signal, the amount of a non-visible light component included in a GIR signal, the amount of a non-visible light component included in a BIR signal, and the amount of a non-visible light component included in an NIR signal are at the same level, respectively, signals can be separated into each of the visible light signals R, G, and B not including the non-visible light component and the non-visible light signal IR not including any of the visible light components. When the amount of a non-visible light component included in the RIR signal, the amount of a non-visible light component included in the GIR signal, the amount of a non-visible light component included in the BIR signal, and the amount of a non-visible light component included in the NIR signal do not match with each other, values of the expression (5) are properly changed, so that the signals can be separated into respective signals of the visible light components R, G, and B of which the amount of a non-visible light component has been attenuated by a prescribed amount and a signal of the non-visible light component IR of which the amount of visible light components has been attenuated by a prescribed amount.

According to the configuration described above, the image signals corresponding to the visible light components and the image signal corresponding to the non-visible light component, which are image-captured at the same exposure time, can be acquired at the same time by an image-capturing process of only one frame. Incidentally, the near infrared light is exemplified as the non-visible light in this embodiment; however, ultraviolet light may be used and wavelengths are not limited to specific ones. In addition, in this embodiment, R, G, and B are exemplified as the visible light; however, for signals including visible light components such as complementary color signals, the same processing can be executed, an effect thereof is the same, and wavelengths are not limited to specific ones.

Next, a method of performing the white balance correction on the visible light signals R, G, and B is described. The light source color estimating unit 106 in this embodiment estimates a color temperature of illumination light radiated to an object based on ratios of signal levels of the visible light signals R, G, and B output from the visible light signal generating unit 104, and outputs an estimation result thereof. For example, there is a method of calculating $\Sigma R$, $\Sigma G$, and $\Sigma B$ by integrating signal amounts of the visible light signals R, G, and B output from the visible light signal generating unit 104 across one screen of an image and outputting $\Sigma R$, $\Sigma G$, and $\Sigma B$ as color distribution estimation information representing a color temperature of the illumination. Alternatively, there is a method of outputting relative ratios of calculated $\Sigma R$, $\Sigma G$, and $\Sigma B$ as color distribution estimation information of the illumination.

The white-balance gain calculating unit 107 calculates gain values to equalize, or approximate to each other, individual values of ER, EG, and EB output from the light source color estimating unit 106 and outputs them; for example, as in the following expressions (10) to (12), Rgain, Ggain, and Bgain are calculated as the gain values to equalize the individual values and are output:

$$R\text{gain} = \Sigma G / \Sigma R \tag{10},$$

$$G\text{gain} = \Sigma G / \Sigma G \tag{11},$$

$$B\text{gain} = \Sigma G / \Sigma B \tag{12}.$$

The white-balance adjusting unit 108 performs gain adjustment on the R, G, and B signals output from the visible light signal generating unit 104 by the following expressions (13) to (15), using the gain values Rgain, Ggain, and Bgain output from the white-balance gain calculating unit 107, and calculates and outputs R2, G2, and B2 on which the white balance correction has been executed:

$$R2 = R\text{gain} \times R \tag{13},$$

$$G2 = G\text{gain} \times G \tag{14},$$

$$B2 = B\text{gain} \times B \tag{15}.$$

According to the configuration described above, the color temperature of the illumination can be estimated from the R, G, and B signals output from the visible light signal generating unit 104 and the white balance correction can be performed on the R, G, and B signals output from the visible light signal generating unit 104 based on the estimation result thereof.

Incidentally, although it is presumed that the white-balance gain calculating unit 107 calculates and outputs the gain values from the ratios of $\Sigma R$, $\Sigma G$, and $\Sigma B$, color temperature information corresponding to distributions of $\Sigma R$, $\Sigma G$, and $\Sigma B$ may be previously held as a table, the color temperature information may be acquired from the table based on information of calculated $\Sigma R$, $\Sigma G$, and $\Sigma B$, and the color temperature information may be output.

Furthermore, although it is described that the light source color estimating unit 106 calculates $\Sigma R$, $\Sigma G$, and $\Sigma B$ integrated for the individual signals of the visible light components R, G, and B output from the visible light signal generating unit 104 and outputs them, the color temperature of the illumination may be estimated using the individual signals of the visible light components R, G, and B output from the visible light signal generating unit 104 and the estimation result thereof may be output; for example, color-difference information may be generated from R, G, and B and the color temperature of the illumination may be estimated based on distribution information of a color-difference space; brightness information may be generated from R, G, and B, the illumination may be estimated according to a level of a brightness, and a color temperature thereof may be calculated; alternatively, a color temperature of the illumination may be estimated from each of a color-difference and a brightness.

According to the configuration described above, even in a state in which the visible light and the non-visible light are mixed in the pixel signals output from the image-capturing element, the color temperature can be estimated by the visible light signal in which the non-visible light has been excluded or its weight has been decreased, and the color temperature of the visible light components can be estimated more accurately.

Next, a method of combining the visible light signals after white balance correction and the non-visible light signals performed in the image composing unit 111 is described. In this embodiment, the visible light signals R2, G2, and B2 after white balance correction output from the white-balance adjusting unit 108 and the non-visible light signal IR output from the non-visible light signal generating unit 105 are combined as the following expressions (16) to (18):

$$R\text{out} = R2 + \text{IR} \tag{16},$$

$$G\text{out} = G2 + \text{IR} \tag{17},$$

$$B\text{out} = B2 + \text{IR} \tag{18}.$$

The brightness signal generating unit 109 calculates a brightness signal Y by the following expression using Rout, Gout, and Bout above and prescribed coefficients $\beta yr$, $\beta yg$, and $\beta yb$, and outputs it:

$$Y = \beta yr \times R\text{out} + \beta yg \times G\text{out} + \beta yb \times B\text{out} \tag{19}.$$

In addition, the color-difference signal generating unit 110 calculates color-difference signals U and V by the following expressions using Rout, Gout, and Bout and prescribed coefficients $\beta ur$, $\beta ug$, $\beta ub$, $\beta vr$, $\beta vg$, and $\beta vb$, and outputs them:

$$U = \beta ur \times R\text{out} + \beta ug \times G\text{out} + \beta ub \times B\text{out} \tag{20},$$

$$V = \beta vr \times R\text{out} + \beta vg \times G\text{out} + \beta vb \times B\text{out} \tag{21}.$$

By using the configuration described above, the visible light components R, G, and B after white balance correction and the non-visible light component IR are combined, so that the brightness signal and the color-difference signal can be generated as one image.

In the case in which the amount of a non-visible light component included in the RIR signal, the amount of a non-visible light component included in the GIR signal, the amount of a non-visible light component included in the BIR signal, and the amount of a non-visible light component included in the NIR signal do not match with each other, when the expressions (1) to (4) are operated, the individual signals of R, G, and B may include negative values and error signals may be superposed individually. In this case, when error signal levels are different from each other, because a hue of output color different signals (ratio of U and V) changes, a tone of color may change and colors may become pseudo colors. However, as in this embodiment, the error signal level generated by subtracting the non-visible light signal IR can be cancelled or attenuated by adding the non-visible light signal IR to the R, G, and B signals after white balance correction again, the hue of the output color-difference signals (ratio of U and V) can be suppressed from changing, and the pseudo colors can be suppressed.

According to the configuration of this embodiment described above, the visible light signals and the non-visible light signals image-captured at the same exposure time can be acquired at the same time by an image-capturing process of only one frame. Namely, the visible light signals and the non-visible light signals do not need to be acquired individually and the image-capturing process can be simplified.

In the case of the process of acquiring the visible light signals and the non-visible light signals individually, a time difference occurs in the exposure time and, under a light source flickering at a high speed such as a fluorescent lamp and an LED, a problem may occur that a difference is generated in illumination light amounts between images; by adopting the configuration described in this embodiment, however, the visible light signals and the non-visible light signals image-captured at the equal exposure time can be acquired at the same time by the image-capturing process of only one frame, thereby resolving the above problem. Therefore, only the visible light signals can be accurately extracted and the color temperature estimation of the illumination and the white balance correction can be performed, regardless of the flicker.

Also, according to this embodiment, white balance correction is not performed on the non-visible light signals which a person can not recognize as color and white balance correction is performed only on the visible light signals which a person recognizes as color, so that superior white balance correction not causing the pseudo colors or the like to occur is enabled.

Moreover, according to this embodiment, an image in which the visible light signals after white balance correction and the non-visible light signals on which white balance correction is not executed have been combined can be generated and an output frame rate thereof can be equalized with a frame rate of image-capturing by the image-capturing element 102.

Furthermore, according to this embodiment, regardless of a ratio of the visible light components and the non-visible light component included in the illumination light, white balance correction can be performed on the visible light signals and superior color reproduction can be realized while an image in which the visible light signals after white balance correction and the non-visible light signals have been combined can be acquired. Namely, according to this embodiment, while an illumination environment may not need to be specified, a prescribed illumination does not need to be disposed, or a difference of illuminations existing on a field such as solar light, a fluorescent lamp, and halogen light does not affect, an image in which superior white balance correction has been performed or information of non-visible light has been superimposed can be obtained under various environments.

Although, in this embodiment, the brightness signal and the color-difference signal are output as the final output signals, it would work with the format of image information including color information; for example, it may be a configuration including an RGB signal generating unit to generate and output an RGB image in place of the brightness signal generating unit 109 and the color-difference signal generating unit 110, or a configuration including an HSV signal generating unit to generate and output information of brightness/saturation/hue.

Embodiment 2

Figure 2:
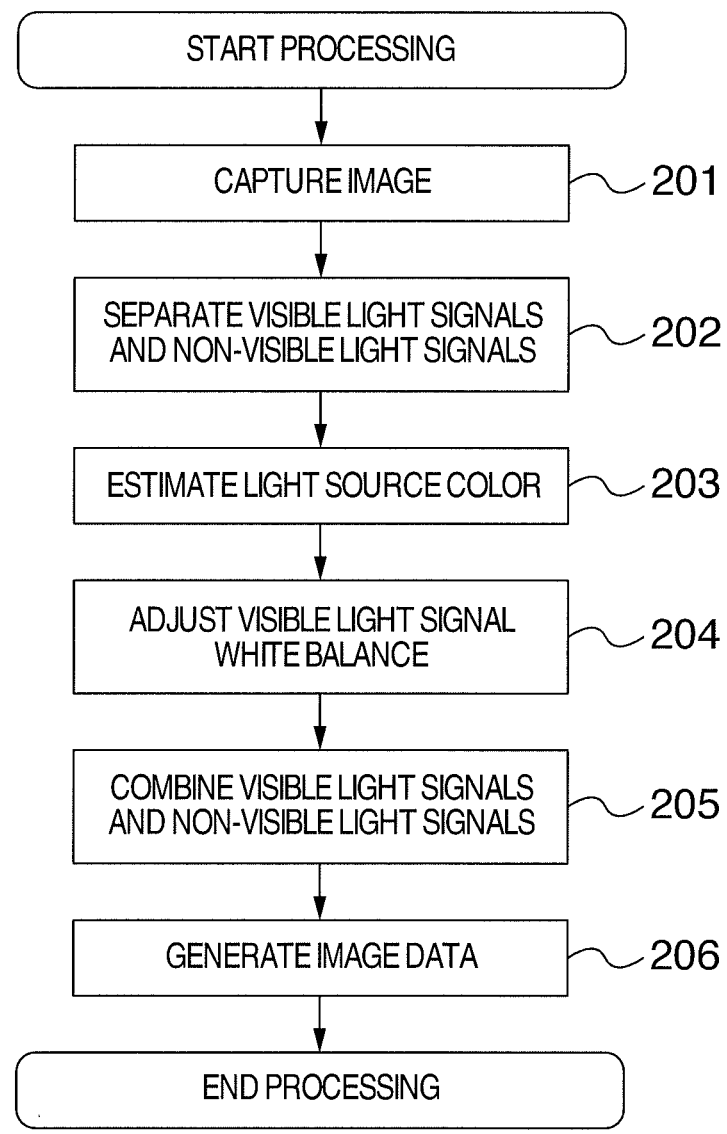
FIG. 2 illustrates a flowchart of an embodiment according to the present invention.

FIG. 2 is a flowchart illustrating an example of the case in which an image-capturing method according to the present invention is executed by a program.

This program is stored in a storage medium included in an image-capturing device or an information processing apparatus capable of acquiring an image and a control unit such as a CPU executes an operation according to the program, so that the same function as the image-capturing device of Embodiment 1 can be implemented by software.

In an image-capturing step 201, an image of one frame is acquired using an image-capturing element that can disperse light radiated from an object into prescribed wavelength components and perform image-capturing.

In a visible light signal/non-visible light signal separation step 202, signal processing is executed on the image captured in the image-capturing step 201 and signals are separated into image signals corresponding to visible light components (visible light signals) and image signals corresponding to a non-visible light component (non-visible light signals).

In a light source color estimation step 203, a color temperature of illumination light radiated to the object is estimated by analyzing signal distributions of only the visible light signals or both the visible light signals and the non-visible light signals out of the signals output from the visible light signal/non-visible light signal separation step 202.

In a visible light signal white balance adjustment step 204, white balance correction is performed on the visible light signals out of the signals separated in the visible light signal/non-visible light signal separation step 202 based on color temperature information obtained from the light source color estimation step 203.

In a visible light signal/non-visible light signal composition step 205, the visible light signals on which white balance correction has been performed in the visible light signal white balance adjustment step 204 and the non-visible light signals separated in the visible light signal/non-visible light signal separation step 202 are combined.

In an image data generating step 206, image data having color information such as an RGB image or a YUV image is generated from an image combined in the visible light signal/non-visible light signal composition step 205.

The image of one frame captured in the image-capturing step 201 in this embodiment may be an image of an array illustrated in FIG. 8, for example. The visible light/non-visible light signal separation step 202 may generate visible light signals and non-visible light signals by executing the same processing as that executed by the demosaic processing unit 103, the visible light signal generating unit 104, and the non-visible light signal generating unit 105 in Embodiment 1. The light source color estimation step 203 may be a method of estimating a color temperature of illumination light radiated to the object by executing the same processing as the light source color estimating unit 106 in Embodiment 1. The visible light signal white balance adjustment step 204 may perform white balance correction on the visible light signals out of the signals separated in the visible light/non-visible light signal separation step 202 by executing the same processing as that executed in the white-balance gain calculating unit 107 and the white-balance adjusting unit 108 in Embodiment 1. The visible light signal/non-visible light signal composition step 205 may combine the signals by executing the same operation processing as the expressions (16) to (18) in Embodiment 1 to obtain an image of one frame. The image data generating step 206 may generate YUV data by executing the same operation processing as the expressions (19) to (21) in Embodiment 1, acquire RGB signals by matrix operation processings, respectively, or execute prescribed signal processing such as tone curve correction in the course of generating each image signal.

According to the configuration described above, as illustrated in FIG. 12, for example, a visible light image after white balance correction 1304 realizing appropriate color reproduction can be acquired by acquiring a visible light+non-visible light image 1301 including visible light and non-visible light radiated from the object in a single image-capturing process at once, separating it into a visible light image 1302 and a non-visible light image 1303 by operation processing, and performing white balance correction only on the visible light image 1302 and, further, an image after composition 1305 can be acquired by combining the visible light image after white balance correction 1304 and the non-visible light image 1303. In the image after composition 1305 at this time, superior color reproduction can be realized by executing white balance correction processing only on the visible light, and one image can be output by the composition so that a file size of an output can be reduced. Moreover, because the visible light and the non-visible light are image-captured at the same time, a time difference is not created in the visible light image and the non-visible light image and a superior image can be obtained regardless of a movement of the object or a change in the illumination.

The other configuration, methods, and advantages are the same as those in Embodiment 1.

Embodiment 3

Figure 3:
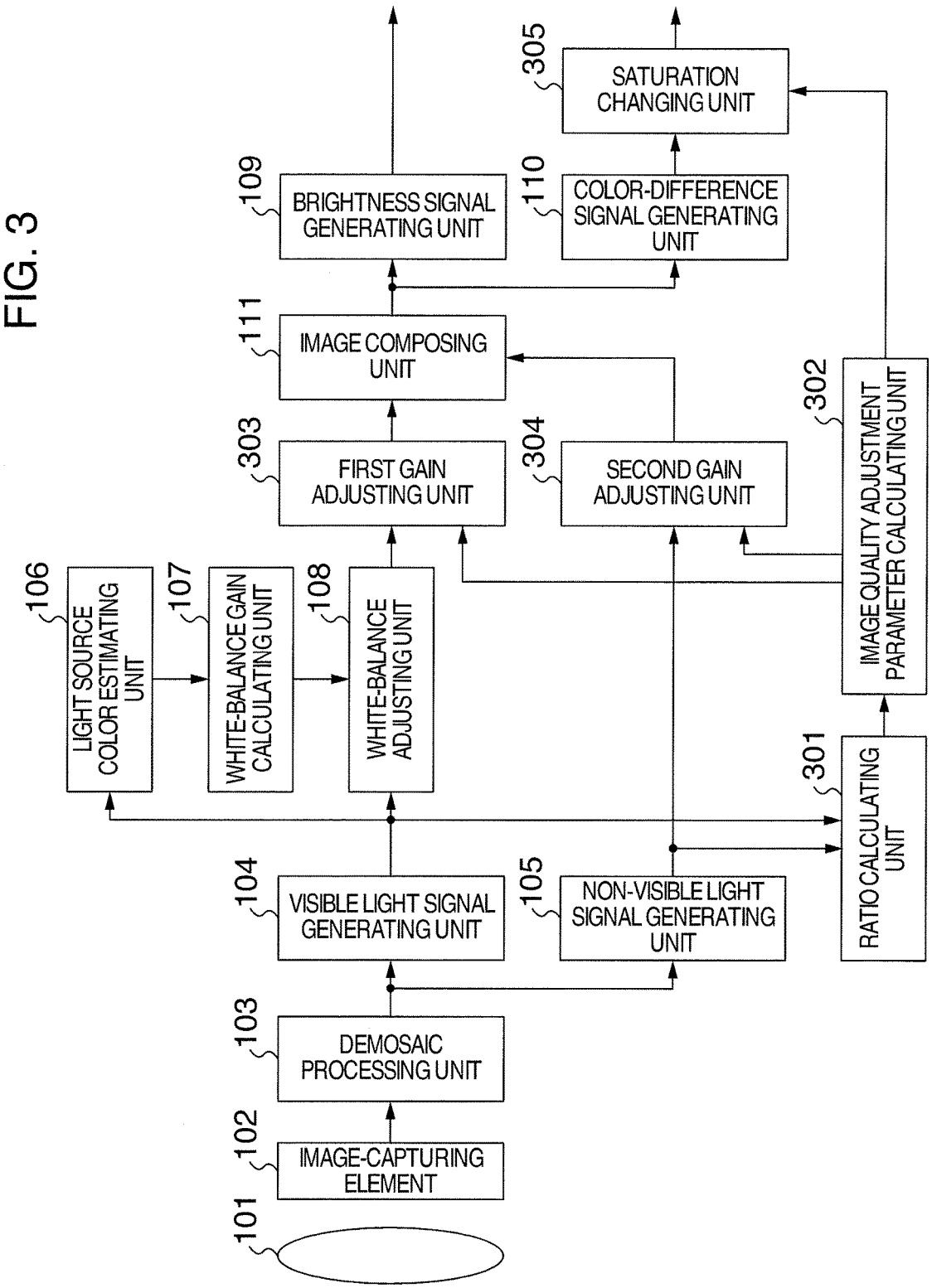
FIG. 3 illustrates an overall configuration diagram of an embodiment according to the present invention.

FIG. 3 is a diagram illustrating an example of an embodiment according to the present invention. An image-capturing device of Embodiment 3 further includes, in addition to the configuration of Embodiment 1: a ratio calculating unit 301 that calculates respective ratios of visible light signals output from the visible light signal generating unit 104 and non-visible light signals output from the non-visible light signal generating unit 105 and outputs ratio information; an image quality adjustment parameter calculating unit 302 that calculates gain information to perform gain adjustment on each of the visible light signals after white balance correction output from the white-balance adjusting unit 108, the non-visible light signals output from the non-visible light signal generating unit 105, and color-difference signals output from the color-difference signal generating unit 110 based on the ratio information output from the ratio calculating unit 301 and outputs it; a first gain adjusting unit 303 that performs gain adjustment on the visible light signals after white balance correction output from the white-balance adjusting unit 108 based on the gain information output from the image quality adjustment parameter calculating unit 302; a second gain adjusting unit 304 that performs the gain adjustment on the non-visible light signals output from the non-visible light signal generating unit 105 based on the gain information output from the image quality adjustment parameter calculating unit 302; and a saturation changing unit 305 that performs gain adjustment on the color-difference signals output from the color-difference signal generating unit 110 based on the gain information output from the image quality adjustment parameter calculating unit 302.

In FIG. 3, incidentally, the gain adjustment is performed on the visible light signals after white balance correction output from the white-balance adjusting unit 108 based on the gain information output from the image quality adjustment parameter calculating unit 302; however, the gain adjustment may be performed on the visible light signals output from the visible light signal generating unit 104.

The image quality adjustment parameter calculating unit 302 in this embodiment receives the ratio information of the visible light signals and the non-visible light signals output, for example, from the ratio calculating unit 301 and, when the signal amount of the visible light signals is smaller than that of the non-visible light signals, it calculates gain to amplify the visible light signals and outputs it to the first gain adjusting unit 303 and calculates gain to attenuate the non-visible light signals and outputs it to the second gain adjusting unit 304. Also, when the signal amount of the visible light signals is larger than the signal amount of the non-visible light signals, for example, it may calculate gain to attenuate the visible light signals and output it to the first gain adjusting unit 303 and calculate gain to amplify the non-visible light signals and output it to the second gain adjusting unit 304.

By making each of the first gain adjusting unit 303 and the second gain adjusting unit 304 perform gain adjustment based on the gain information, signal levels are changed such that the visible light signals and the non-visible light signals become prescribed ratios to each other and are combined in the image composing unit 111. Namely, an image signal can be amplified for an object from which the visible light signals are not sufficiently obtained to have sufficient sensitivity and the image signal can be amplified for an object from which the non-visible light signals are not obtained sufficiently to have sufficient sensitivity.

Also, the image quality adjustment parameter calculating unit 302 in this embodiment can calculate gain to hold a visible light signal level and output it to the first gain adjusting unit 303 and can calculate gain to attenuate a non-visible light signal level and output it to the second gain adjusting unit 304 when the signal amount of the non-visible light signals is extremely smaller than that of the visible light signals. By letting each of the first gain adjusting unit 303 and the second gain adjusting unit 304 perform gain adjustment based on the gain information, the non-visible light signal level can be attenuated or eliminated to be combined with the visible light signals. Namely, in the non-visible light signals of which the signal amount is small, noise components become dominant, and an image with small noises and high visibility can be composed by suppressing superposition of the noise components.

Incidentally, if the ratio calculating unit 301 is configured to calculate and output ratios of the visible light signals and the non-visible light signals in a pixel unit, the above advantage can be obtained by simple processing. Also, if the ratio calculating unit 301 is configured to calculate and output the ratios after applying a band restriction filter such as a Gaussian filter to the visible light signals and the non-visible light signals in a pixel unit, respective signal amounts of the visible light signals and the non-visible light signals can be adjusted according to reflectance at each wavelength specific to each object for each object existing in a screen without being affected by fine dot pictures or noises. Moreover, if the ratio calculating unit 301 is configured to calculate and output an overall ratio after performing weighting to an entire screen or each region of the entire screen, respective signal amounts of the visible light signals and the non-visible light signals can be adjusted according to wavelength characteristics of illumination light radiated to an object which is pictured in an image of one acquired frame. Even when a combination of the gain adjusting methods using the ratios of the pixel unit, the ratios after application of the band restriction filter, or the ratio of the entire screen, the individual advantages can be obtained at the same time.

The image quality adjustment parameter calculating unit 302 in this embodiment may, for example, receive the ratio information of the visible light signals and the non-visible light signals output from the ratio calculating unit 301 and, when the signal amount of the visible light signals is smaller than that of the non-visible light signals, it can calculate gain to increase the saturation (deepen a color) and output it to the saturation changing unit 305. With this configuration, when the signal amount of the visible light signals treated as color information is small, the saturation can be increased, so that a problem that a color of an output image becomes faint can be mitigated.

Also, the image quality adjustment parameter calculating unit 302 in this embodiment may, for example, receive the ratio information of the visible light signals and the non-visible light signals output from the ratio calculating unit 301 and, when the signal amount of the visible light signals is extremely small for example, it can calculate gain to decrease the saturation (lighten a color) and output it to the saturation changing unit 305. With this configuration, when the signal amount of the visible light signals treated as color information is extremely small, that is, effective signals of an object are not obtained and only noise signals are obtained, color noise can be suppressed.

The other configuration, methods, and advantages are the same as those in Embodiment 1 or 2.

Embodiment 4

Figure 4:
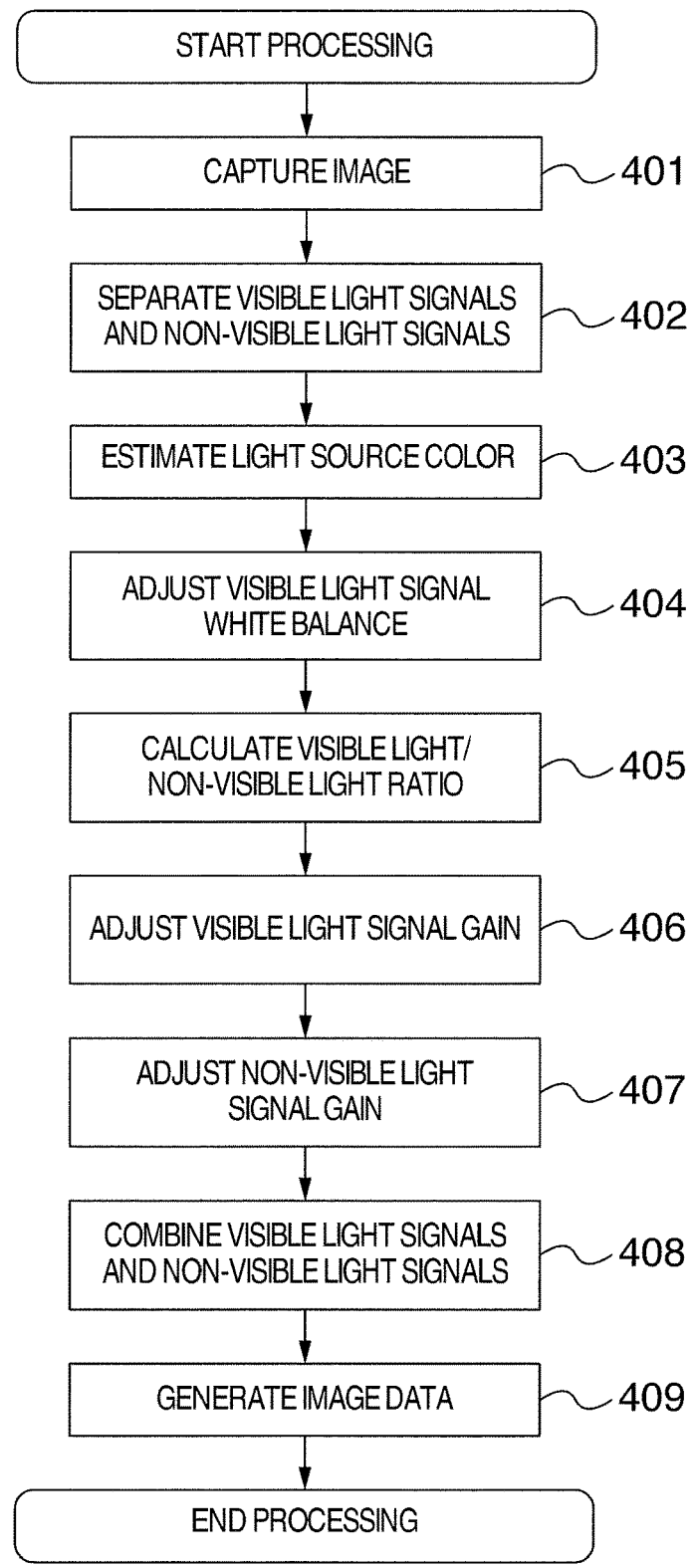
FIG. 4 illustrates a flowchart of an embodiment according to the present invention.

FIG. 4 is a flowchart illustrating an example of the case in which an image-capturing method according to the present invention is executed by a program.

This program is stored in a storage medium included in an image-capturing device or an information processing apparatus capable of acquiring an image and a control unit such as a CPU executes an operation according to the program, so that the same function as the image-capturing device of Embodiment 1 can be implemented by software.

In an image-capturing step 401, an image of one frame is acquired using an image-capturing element that can disperse light radiated from an object into prescribed wavelength components and perform image-capturing.

In a visible light signal/non-visible light signal separation step 402, signal processing is executed on the image captured in the image-capturing step 401 and an image is separated into an image corresponding to visible light components (visible light signals) and an image corresponding to a non-visible light component (non-visible light signals).

In a light source color estimation step 403, a color temperature of illumination light radiated to the object is estimated by analyzing signal distributions of only the visible light signals or both the visible light signals and the non-visible light signals out of the signals output from the visible light signal/non-visible light signal separation step 402.

In a visible light signal white balance adjustment step 404, white balance correction is performed on the visible light signals out of the signals separated in the visible light signal/non-visible light signal separation step 402 based on color temperature information obtained from the light source color estimation step 403.

In a visible light/non-visible light ratio calculation step 405, a ratio of the visible light signals separated in the visible light signal/non-visible light signal separation step 402 or the visible light signals on which white balance correction has been performed in the visible light signal white balance adjustment step 404 and the non-visible light signals separated in the visible light signal/non-visible light signal separation step 402 is calculated.

In a visible light signal gain adjustment step 406, gain adjustment is performed on the visible light signals for which white balance correction is performed in the visible light signal white balance adjustment step 404, based on the ratio calculated in the visible light/non-visible light ratio calculation step 405.

In a non-visible light signal gain adjustment step 407, gain adjustment is performed on the non-visible light signals calculated in the visible light signal/non-visible light signal separation step 402, based on the ratio calculated in the visible light/non-visible light ratio calculation step 405.

In a visible light signal/non-visible light signal composition step 408, the visible light signals after the gain is adjusted in the visible light signal gain adjustment step 406 and the non-visible light signals after the gain is adjusted in the non-visible light signal gain adjustment step 407 are combined at a prescribed ratio to generate a composite signal.

In an image data generating step 409, image data having color information such as an RGB image or a YUV image is generated from an image combined in the visible light signal/non-visible light signal composition step 408.

The image-capturing step 401, the visible light signal/non-visible light signal separation step 402, the light source color estimation step 403, and the visible light signal white balance adjustment step 404 in this embodiment may be the same processings as those described in Embodiment 2.

According to the configuration described above, image signals for visible light components realizing appropriate color reproduction can be acquired by acquiring the visible light and the non-visible light radiated from the object in a single image-capturing process at once, separating it into signals corresponding to visible light components and a non-visible light component, and performing white balance correction only on the signals corresponding to the visible light components and, further, a combined image in which the image signals for the visible light components after white balance correction and the image signals for the non-visible light component have been adjusted at a prescribed ratio can be acquired; because they can become one image by composition, a file size of an output can be reduced.

Incidentally, in the visible light/non-visible light ratio calculation step 405 the ratios may be calculated in the pixel unit and in the visible light signal gain adjustment step 406 and the non-visible light signal gain adjustment step 407 the gain adjustments are performed in the pixel unit based on the ratios of the pixel unit to obtain the above advantages by the simple processing. In addition, by calculating the ratios after applying a band restriction filter such as a Gaussian filter to the visible light signals and the non-visible light signals in the pixel unit in the visible light/non-visible light ratio calculation step 405 and performing the gain adjustment in the same pixel unit based on the ratios of the pixel unit in the visible light signal gain adjustment step 406 and the non-visible light signal gain adjustment step 407, respective signal amounts of the visible light signals and the non-visible light signals can be adjusted according to reflectance at each wavelength specific to each object for each object existing in a screen without being affected by fine dot pictures or noises.

In addition, calculating in the visible light/non-visible light ratio calculation step 405 the overall ratio after performing weighting to an entire screen or each region of the entire screen, for example, and performing the gain adjustment based on the ratios of the pixel unit in the visible light signal gain adjustment step 406 and the non-visible light signal gain adjustment step 407 allow adjustment of respective signal amounts of the visible light signals and the non-visible light signals according to wavelength characteristics of illumination light radiated to an object which is pictured in an image of one acquired frame.

Although not illustrated in FIG. 4, a saturation change step for changing the saturation of the color image generated in the image data generating step 409 based on the ratios calculated in the visible light/non-visible light ratio calculation step 405 can be further provided. For example, when a signal amount of the visible light signals is smaller than that of the non-visible light signals in the ratios calculated in the visible light/non-visible light ratio calculation step 405, the saturation may be changed such that the saturation is increased (a color is deepened). By this configuration, when the signal amount of the visible light signals treated as color information is small, the saturation can be increased, so that a problem that a color of an output image becomes faint can be mitigated.

For example, when the signal amount of the visible light signals is extremely small in the ratios calculated in the visible light/non-visible light ratio calculation step 405, the saturation may be changed such that the saturation is decreased (a color is lightened). By this configuration, when the signal amount of the visible light signals treated as the color information is extremely small, that is, an effective signal of an object is not obtained and only a noise signal is obtained, color noise can be suppressed.

The other configuration, methods, and advantages are the same as those in Embodiment 1, 2, or 3.

Embodiment 5

Figure 5:
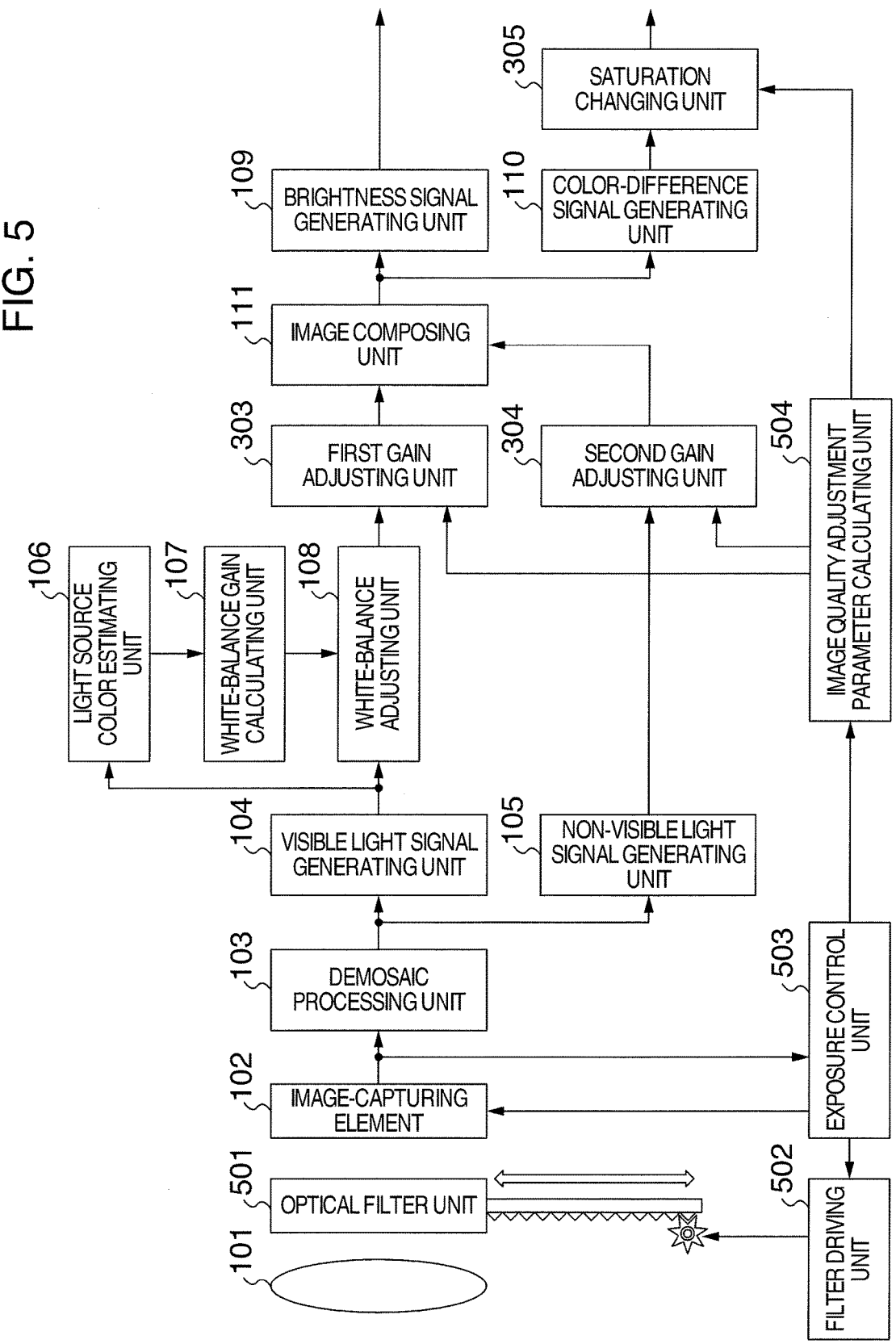
FIG. 5 illustrates an overall configuration diagram of an embodiment according to the present invention.

FIG. 5 is a diagram illustrating an example of an embodiment according to the present invention. An image-capturing device of Embodiment 5 further includes an optical filter unit 501, a filter driving unit 502, an exposure control unit 503, and an image quality adjustment parameter calculating unit 504, in addition to the configuration of Embodiment 3.

The optical filter unit 501 in this embodiment is an optical filter that cuts or attenuates a prescribed wavelength band for light from an object, which enters through a lens 101.

The filter driving unit 502 is a mechanism that loads and unloads the optical filter unit 501 on an optical path between the lens 101 and an image-capturing element 102.

The exposure control unit 503 calculates an exposure time, a signal amplification gain value, and the like in the image-capturing element 102 to realize an optimal exposure state based on an exposure time and a signal amplification gain value set to the image-capturing element 102 and a signal level of an image signal output from the image-capturing element 102, and sets them to the image-capturing element 102. In addition, the exposure control unit 503 controls the filter driving unit based on the exposure time and the signal amplification gain value set to the image-capturing element 102 and the signal level of the image signal output from the image-capturing element 102 to load and unload the optical filter unit 501 and outputs loading/unloading information of the optical filter unit 501 to the image quality adjustment parameter calculating unit 504.

Based on the loading/unloading information of the optical filter unit 501 output from the exposure control unit 503, the image quality adjustment parameter calculating unit 504 calculates gain information to control gain of visible light signals and outputs it to a first gain adjusting unit 303, and calculates gain information to control gain of a non-visible light signal and outputs it to a second gain adjusting unit 304.

In the above configuration, a description is given for the case where the optical filter unit 501 is configured as an optical filter transmitting visible light and cutting non-visible light, for example, and the exposure control unit 503 determines whether an amount of light incident on an image-capturing element 102 is sufficient based on the signal level of the image signal obtained from the image-capturing element 102 and the information of the exposure time and the signal amplification gain value set to the image-capturing element 102 to remove the optical filter unit 501 from the optical path between the lens 101 and the image-capturing element 102 when the amount of light is not sufficient and to insert the optical filter unit 501 into the optical path between the lens 101 and the image-capturing element 102 when the amount of light is sufficient.

According to the above configuration, the optical filter unit 501 is loaded on the optical path between the lens 101 and the image-capturing element 102 and an image of only the visible light can be acquired under an image-capturing condition in which an amount of light from an object is sufficient and sensitivity is superior, and the optical filter unit 501 is removed from the optical path between the lens 101 and the image-capturing element 102 to acquire the non-visible light along with the visible light at the same time so that the sensitivity can be improved under an image-capturing condition in which the amount of light from the object is not sufficient and the sensitivity is insufficient; a superior color image can be obtained in the entire image-capturing conditions.

In addition to the above configuration, the image quality adjustment parameter calculating unit 504 may calculate gain information to cancel or attenuate a non-visible light signal output from a non-visible light signal generating unit 105 and output the gain information to the second gain adjusting unit 304 under the image-capturing condition in which the optical filter unit 501 is inserted into the optical path between the lens 101 and the image-capturing element 102, when the amount of light is large. Because the non-visible light components are cut by the optical filter unit 501, an output of the non-visible light signal generating unit 105 is only noise signals; the noise signals then can be cancelled or attenuated and noise superposed on an image after final visible light/non-visible light composition can be further suppressed.

The other configuration, methods, and advantages are the same as those in Embodiment 1, 2, 3, or 4.

Embodiment 6

Figure 6:
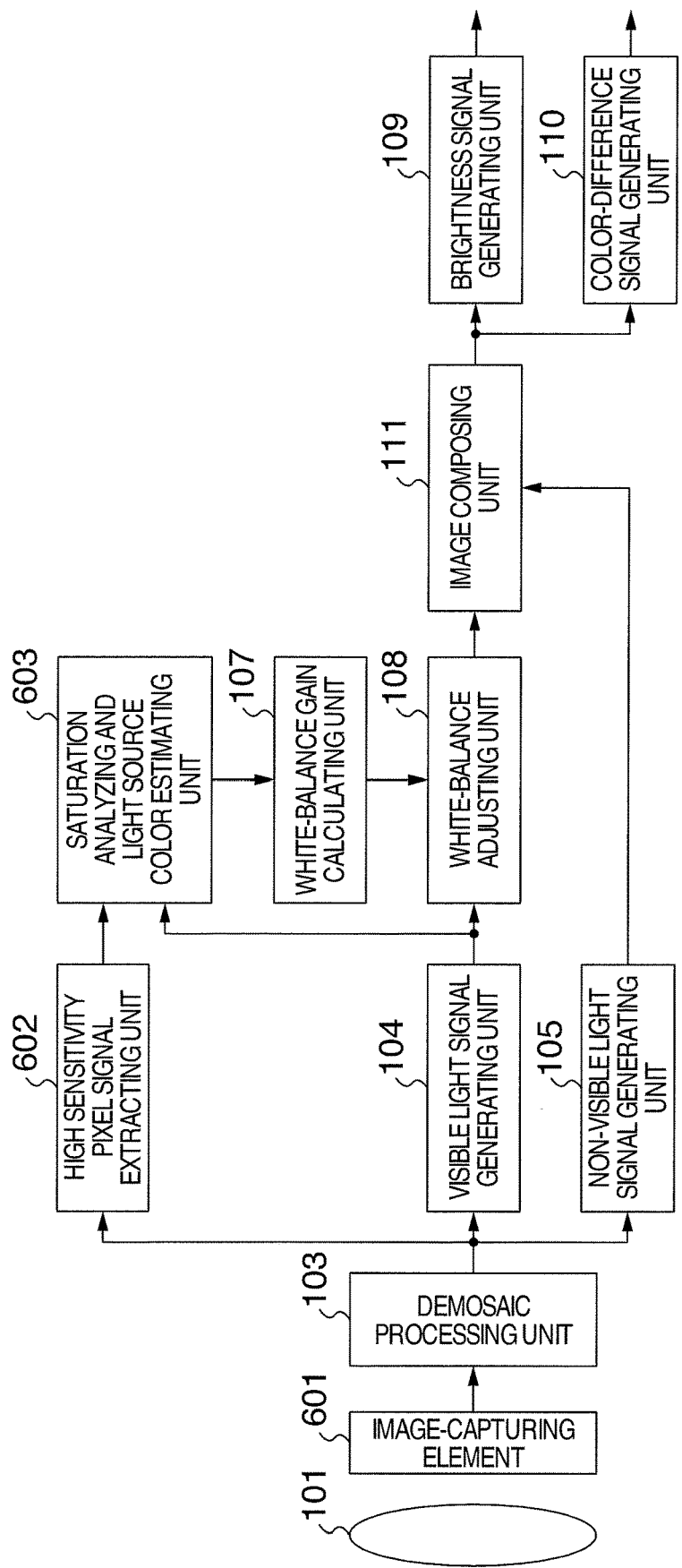
FIG. 6 illustrates an overall configuration diagram of an embodiment according to the present invention.

FIG. 6 is a diagram illustrating an example of an embodiment according to the present invention. An image-capturing device of this embodiment includes: a lens 101 that focuses visible light/non-visible light from an object at a prescribed focal distance; an image-capturing element 601 that disperses the visible light/non-visible light focused by the lens 101 with various color filters, executes photoelectric conversion, and outputs a plurality of pixel signals corresponding to prescribed wavelength components; a demosaic processing unit 103 that executes demosaic processing on the pixel signals from the image-capturing element 601; a visible light signal generating unit 104 that executes operation processing on the pixel signals output from the demosaic processing unit 103 and extracts pixel signals for visible light components (visible light signals); a non-visible light signal generating unit 105 that executes operation processing on the pixel signals output from the demosaic processing unit 103 and extracts pixel signals for a non-visible light component (non-visible light signals); a high sensitivity pixel signal extracting unit 602 that extracts a pixel signal having highest sensitivity (in the case of an image-capturing element described in FIG. 9, a WIR pixel signal) among the plurality of pixel signals from the demosaic processing unit 103 and outputs it; a saturation analyzing and light source color estimating unit 603 that calculates a saturation level for the pixel signal from the high sensitivity pixel signal extracting unit 602 and estimates a light source color based on the saturation level and the pixel signals from the visible light signal generating unit 104; a white-balance gain calculating unit 107 that calculates gain to perform white balance correction on the output pixel signals of the visible light signal generating unit 104, based on a color temperature estimation result of the saturation analyzing and light source color estimating unit 603; a white-balance adjusting unit 108 that performs white balance correction on the pixel signals output from the visible light signal generating unit 104, based on gain information from the white-balance gain calculating unit 107; an image composing unit 111 that combines the visible light signals on which white balance correction has been performed by the white-balance adjusting unit 108 and the non-visible light signals output from the non-visible light signal generating unit; a brightness signal generating unit 109 that generates brightness signals using pixel signals after composition output from the image composing unit 111; and a color-difference signal generating unit 110 that generates color-difference signals using the pixel signals after composition output from the image composing unit 111.

FIG. 9 illustrates a pixel array of the image-capturing element 601 in this embodiment. FIG. 11 illustrates an example of spectral sensitivity characteristics of four types of color filters of R+IR (RIR), G+IR (GIR), B+IR (BIR), and R+G+B+IR (WIR) arranged in the image-capturing element 601.

Pixels to which a color filter for RIR is arranged are to have sensitivity around wavelengths of red (R) of visible light and around wavelengths of near infrared light (IR), pixels to which a color filter for GIR is arranged are to have sensitivity around wavelengths of green (G) of the visible light and around wavelengths of near infrared light (IR), pixels to which a color filter for BIR is arranged are to have sensitivity around wavelengths of blue (B) of the visible light and around wavelengths of near infrared light (IR), and pixels to which a color filter for WIR is arranged are to have sensitivity around wavelengths of red (R), green (G), and blue (B) of the visible light and around wavelengths of near infrared light (IR).

The visible light signal generating unit 104 and the non-visible light signal generating unit 105 are the same as those in Embodiment 1; according to the pixel array of the image-capturing element 601 used in this embodiment, however, the visible light signals R, G, and B and the non-visible light signals IR are generated by the following matrix operation and are output:

$$R = \alpha_{rr} \times RIR + \alpha_{rg} \times GIR + \alpha_{rb} \times BIR + \alpha_{rw} \times WIR \quad (22),$$

$$G = \alpha_{gr} \times RIR + \alpha_{gg} \times GIR + \alpha_{gb} \times BIR + \alpha_{gw} \times WIR \quad (23),$$

$$B = \alpha_{br} \times RIR + \alpha_{bg} \times GIR + \alpha_{bb} \times BIR + \alpha_{bw} \times WIR \quad (24),$$

$$IR = \alpha_{ir} \times RIR + \alpha_{ig} \times GIR + \alpha_{ib} \times BIR + \alpha_{iw} \times WIR \quad (25).$$

Here, each α represents a coefficient for each signal and, when the following expression (26) is given for the coefficients of α, for example, $$\begin{pmatrix} \alpha_{rr} & \alpha_{rg} & \alpha_{rb} & \alpha_{rw} \\ \alpha_{gr} & \alpha_{gg} & \alpha_{gb} & \alpha_{gw} \\ \alpha_{br} & \alpha_{bg} & \alpha_{bb} & \alpha_{bw} \\ \alpha_{ir} & \alpha_{ig} & \alpha_{ib} & \alpha_{iw} \end{pmatrix} = \begin{pmatrix} 0.5 & -0.5 & -0.5 & 0.5 \\ -0.5 & 0.5 & -0.5 & 0.5 \\ -0.5 & -0.5 & 0.5 & 0.5 \\ 0.5 & 0.5 & 0.5 & -0.5 \end{pmatrix}, \quad (26)$$

the expressions (22) to (25) become the following expressions (27) to (30):

$$R = (RIR - GIR - BIR + WIR)/2 \quad (27),$$

$$G = (-RIR + GIR - BIR + WIR)/2 \quad (28),$$

$$B = (-RIR - GIR + BIR + WIR)/2 \quad (29),$$

$$IR = (RIR + GIR + BIR - WIR)/2 \quad (30).$$

As illustrated in FIG. 11, if the amount of a non-visible light component included in an RIR signal, the amount of a non-visible light component included in a GIR signal, the amount of a non-visible light component included in a BIR signal, and the amount of a non-visible light components included in a WIR signal are at the same level, respectively, signals can be separated into each signal of the visible light components R, G, and B not including the non-visible light componens and a signal of the non-visible light component IR not including any of the visible light components, according to the expressions (27) to (30). On the other hand, when the amount of a non-visible light component included in the RIR signal, the amount of a non-visible light component included in the GIR signal, the amount of a non-visible light component included in the BIR signal, and the amount of a non-visible light component included in the WIR signal do not match with each other, the coefficients of a's of the expression (26) are appropriately changed, so that the signals can be separated into respective signals of the visible light components R, G, and B of which the amount of the non-visible light component has been attenuated by a prescribed amount and a signal of the non-visible light component IR of which the amount of visible light components has been attenuated by a prescribed amount.

According to the configuration described above, the image signals corresponding to the visible light components and the image signals corresponding to the non-visible light component, which are image-captured at the same exposure time, can be acquired at the same time by an image-capturing process of only one frame. Furthermore, by setting one of the four color filter arrays of the image-capturing element 601 to WIR, compared to an image-capturing element of an RGB Bayer array or the pixel array illustrated in FIG. 8, photoelectric conversion can be executed on light of larger visible light components and sensitivity improvement can be realized.

The high sensitivity pixel signal extracting unit 602 in this embodiment extracts the WIR pixels from the demosaic processing unit 103 and outputs to the saturation analyzing and light source color estimating unit 603. At this time, it may be configured that the pixel signals corresponding to WIR among the signals from the demosaic processing unit 103 may be appropriately selected and output. The saturation analyzing and light source color estimating unit 603 first determines whether the pixel is saturated by determining signal levels of the WIR pixel signals obtained from the high sensitivity pixel signal extracting unit 602. When as a determination result it is found to be saturated, the visible light signals are canceled or their weights are decreased and, when it is found not to be saturated, their weights are increased to 1 or more; thereafter, the light source color is estimated for the visible light signals with their weight changed, as described in the light source color estimating unit 106 in Embodiment 1.

Here, if sensitivity characteristics of the signals RIR, GIR, BIR, and WIR for the four color filter arrays from the image-capturing element 601 satisfy the following expression (31), the pixel of WIR can be defined as a pixel that is more easily saturated than the other three pixels:

$$RIR \leq WIR\ GIR \leq WIR\ BIR \leq WIR \quad (31).$$

When even one of the pixel signals used in the expressions (22) to (25) happens to be a saturated signal, that is, at least WIR is in a saturated state, the individual signals of R, G, B, and IR cannot be accurately extracted and it can be estimated that a false color occurs in a final image. In this embodiment, determination of whether a pseudo color occurs or not is performed as extraction of WIR and saturation determination thereof; when it is determined that it is saturated, the false color is expected to occur and the weights of the visible light signals used for estimation of the light source color can be decreased.

Namely, according to the configuration of this embodiment, the image signals corresponding to the visible light components and the image signals corresponding to the non-visible light component, which are image-captured at the same exposure time, can be acquired at the same time by the image-capturing process of only one frame, the light source color can be accurately estimated without being affected by the pseudo color occurring when the pixel is saturated, and superior white balance correction can be applied to the acquired visible light signals.

Incidentally, it is described here that the high sensitivity pixel signal extracting unit 602 extracts WIR; however, when the array of the image-capturing element illustrated in FIG. 8 is used, GIR may be extracted and the pixel signal having the highest signal level among those of RIR, GIR, BIR, and NIR may be selected and output. According to the configuration described above, the same advantages can be obtained regardless of the array of the image-capturing element.

The other configuration, methods, and advantages are the same as those in Embodiment 1, 2, 3, 4, or 5.

Embodiment 7

Figure 7:
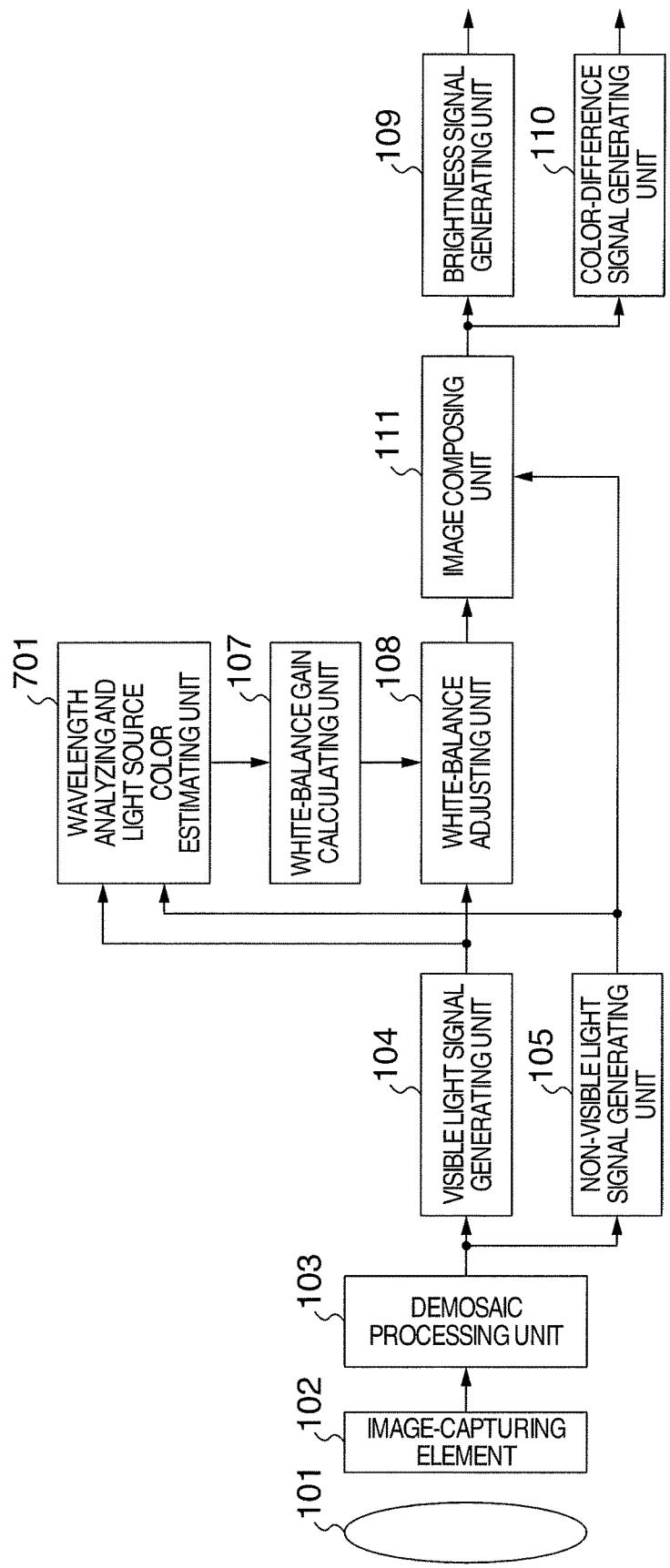
FIG. 7 illustrates an overall configuration diagram of an embodiment according to the present invention.

FIG. 7 is a diagram illustrating an example of an embodiment according to the present invention. In an image-capturing device of this embodiment, the light source color estimating unit 106 in the configuration illustrated in Embodiment 1 is replaced with a wavelength analyzing and light source color estimating unit 701.

The wavelength analyzing and light source color estimating unit 701 receives visible light signals from a visible light signal generating unit 104 and non-visible light signals from a non-visible light signal generating unit 105, analyzes wavelength distributions of the respective visible light signals and the non-visible light signals, and estimates a light source color.

According to the configuration described above, a difference of an illumination between a fluorescent lamp or an LED hardly including the non-visible light signals and halogen light or xenon light having a similar distribution of the visible light components but including near infrared light can be determined at higher precision. Also, because the visible light signals and the non-visible light signals are acquired at the same exposure time and are used for the determination, the light source color can be accurately determined without being affected by a flicker component (brightness change generated due to a time difference) of the fluorescent lamp or the LED.

Furthermore, the wavelength analyzing and light source color estimating unit 701 may analyze each of the visible light signals from the visible light signal generating unit and the non-visible light signals from the non-visible light signal generating unit, divide pixels into Pixel Group 1 in which the non-visible light does not exist or is equal to or lower than a prescribed level and Pixel Group 2 in which the non-visible light exists or is higher than the prescribed level, and estimate a color temperature for each of Pixel Groups 1 and 2.

In this case, a white-balance gain calculating unit 107 selects (presets or user-selects) one of two color temperature estimation results of Pixel Groups 1 and 2 obtained from the wavelength analyzing and light source color estimating unit 701, calculates gain to perform white balance adjustment, and outputs it. According to the configuration described above, in a scene where a fluorescent lamp and solar light are mixed, for example, a color temperature can be estimated only from an image region illuminated by the fluorescent lamp and white balance processing can be executed in accordance with the fluorescent lamp. Therefore, the illumination of the fluorescent lamp or the LED, for example, hardly including the non-visible light signals and a light source having a similar distribution of the visible light components but including near infrared light can be differentiated individually at higher precision and the white balance correction can be performed more accurately in accordance with either one of light sources.

The other configuration, methods, and advantages are the same as those in Embodiment 1, 2, 3, 4, 5, or 6.

Incidentally, in the present invention, an image-capturing device in which a part or all of the components in the above embodiments are configured by hardware can be provided and an image-capturing method in which a part or all of the components are configured by software programs can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image-capturing device comprising:
an image-capturing element that executes photoelectric conversion on light including visible light and non-visible light and outputs a pixel signal;
a demosaic processor that executes demosaic processing on the pixel signal outputted by the image-capturing element;
a visible light signal generating unit that extracts and outputs a visible light signal from the pixel signal processed by the demosaic processor;
a light source color estimating unit that estimates a color temperature of a light source from the visible light signal from the visible light signal generating unit and outputs an estimation result;
a white-balance adjusting unit that performs white balance correction only on the visible light signal, which is extracted from the pixel signal processed by the demosaic processor, received from the visible light signal generating unit according to the estimation result from the light source color estimating unit and outputs a white-balance corrected visible light signal;
a non-visible light signal generating unit that extracts and outputs a non-visible light signal from the pixel signal processed by the demosaic processor;
an image composing unit that combines and outputs the white-balance corrected visible light signal received from the white-balance adjusting unit and the non-visible light signal received from the non-visible light signal generating unit;
a ratio calculating unit that calculates and outputs a ratio of the visible light signal and the non-visible light signal;
an image quality adjustment parameter calculating unit that individually calculates and outputs first gain information to perform gain adjustment on the visible light signal and second gain information to perform the gain adjustment on the non-visible light signal, based on the ratio of the visible light signal and the non-visible light signal;
a first gain adjusting unit that performs gain adjustment on the visible light signal output from the visible light signal generating unit or the white-balance corrected visible light signal output from the white-balance adjusting unit, using the first gain information output from the image quality adjustment parameter calculating unit; and
a second gain adjusting unit that performs gain adjustment on the non-visible light signal output from the non-visible light signal generating unit, using the second gain information output from the image quality adjustment parameter calculating unit.

2. The image-capturing device according to claim 1, further comprising:
a filter driving unit that moves an optical filter cutting a prescribed wavelength band out of light radiated to the image-capturing element to load/unload on an optical path; and
an exposure control unit that changes setting of an exposure condition of the image-capturing element and controls loading/unloading of the optical filter by controlling the filter driving unit, based on a pixel signal level from the image-capturing element and the setting of an exposure condition set in the image-capturing element;
wherein the image quality adjustment parameter calculating unit individually calculates and outputs first gain information to perform gain adjustment on the visible light signal and second gain information to perform gain adjustment on the non-visible light signal, based on a loading/unloading state of the optical filter.

3. The image-capturing device according to claim 1, further comprising:
a signal extracting unit that extracts a pixel signal subjected to the photoelectric conversion through a filter having highest transmittance among pixel signals subjected to photoelectric conversion through filters having a plurality of transmission characteristics arranged in a pixel unit in the image-capturing element;
a light source color estimating unit that performs weighting for the visible light signal according to whether a signal level of the extracted pixel signal is higher or lower than a prescribed level and estimates a light source color from the visible light signal after weighting; and
a white-balance adjusting unit that performs white balance correction on and outputs the visible light signal from the visible light signal generating unit, based on an estimation result from the light source color estimating unit.

4. The image-capturing device according to claim 1, further comprising:
a signal extracting unit that extracts a pixel signal having a highest signal level in a prescribed image area among pixel signals subjected to photoelectric conversion through a filter having a plurality of transmission characteristics arranged in a pixel unit in the image-capturing element;
a light source color estimating unit that performs weighting for the visible light signal according to whether a signal level of the extracted pixel signal is higher or lower than a prescribed level and estimates a light source color from the visible light signal after weighting; and
a white-balance adjusting unit that performs white balance correction on and outputs the visible light signal from the visible light signal generating unit, based on an estimation result from the light source color estimating unit.

5. The image-capturing device according to claim 1, wherein the light source color estimating unit estimates a color temperature and a type of a light source illuminating an object based on a signal distribution of the visible light signal from the visible light signal generating unit and a signal distribution of the non-visible light signal from the non-visible light signal generating unit, and outputs an estimation result.

6. An image-capturing device comprising:
an image-capturing element that executes photoelectric conversion on light including visible light and non-visible light and outputs a pixel signal;
a demosaic processor that receives the pixel signal from the image-capturing element and executes demosaic processing on the pixel signal;
a visible light signal generating unit that extracts and outputs a visible light signal from the pixel signal processed by the demosaic processor;

a light source color estimating unit that estimates a color temperature of a light source from the visible light signal from the visible light signal generating unit and outputs an estimation result;

a white-balance adjusting unit that performs white balance correction only on the visible light signal, which is extracted from the pixel signal processed by the demosaic processor, received from the visible light signal generating unit according to the estimation result from the light source color estimating unit and outputs a white-balance corrected visible light signal;

a non-visible light signal generating unit that extracts and outputs a non-visible light signal from the pixel signal processed by the demosaic processor;

an image composing unit that combines and outputs the white-balance corrected visible light signal received from the white-balance adjusting unit and the non-visible light signal received from the non-visible light signal generating unit;

a ratio calculating unit that calculates and outputs a ratio of the visible light signal and the non-visible light signal;

an image quality adjustment parameter calculating unit that calculates and outputs third gain information to change saturation of an image signal output from the image composing unit, based on the ratio of the visible light signal and the non-visible light signal; and a saturation changing unit that changes saturation of an image output from the image composing unit, using the third gain information output from the image quality adjustment parameter calculating unit.

7. An image-capturing method comprising the steps of:

executing, by an image-capturing element, photoelectric conversion on light including visible light and non-visible light and outputting an image signal;

performing demosaic processing on the image signal received from the image-capturing element;

separating the output image signal into a visible light signal and a non-visible light signal after the demosaic processing;

estimating a color temperature of illumination light radiated onto an object based on a signal distribution of only the visible light signal or signal distributions of both the visible light signal and the non-visible light signal;

performing white balance correction only on the visible light signal, separated from the image signal processed in the demosaic processing, based on estimated color temperature information to produce a white-balance corrected visible light signal;

combining the white-balance corrected visible light signal and the separated non-visible light signal;

calculating and outputting a ratio of the visible light signal and the non-visible light signal;

individually calculating and outputting first gain information to perform gain adjustment on the visible light signal and second gain information to perform the gain adjustment on the non-visible light signal, based on the ratio of the visible light signal and the non-visible light signal;

performing gain adjustment on the visible light signal output from the visible light signal generating unit or the white-balance corrected visible light signal output from the white-balance adjusting unit, using the first gain information output from the image quality adjustment parameter calculating unit; and performing gain adjustment on the non-visible light signal output from the non-visible light signal generating unit, using the second gain information output from the image quality adjustment parameter calculating unit.

8. An image-capturing method comprising the steps of:

outputting an image signal using an image-capturing element that disperses light including visible light and non-visible light into prescribed wavelength components and performs image-capturing;

performing demosaic processing on the image signal received from the image-capturing element;

separating the image signal into a visible light signal and a non-visible light signal after the demosaic processing;

estimating a color temperature of illumination light radiated onto an object based on a signal distribution of only the visible light signal or signal distributions of both the visible light signal and the non-visible light signal;

performing white balance correction only on the visible light signal, separated from the image signal processed in the demosaic processing, based on estimated color temperature information to produce a white-balance corrected visible light signal;

calculating a ratio of the separated visible light signal or the white-balance corrected visible light signal and the separated non-visible light signal;

performing gain adjustment on the white-balance corrected visible light signal based on the calculated ratio;

performing gain adjustment on the separated non-visible light signal based on the calculated ratio; and generating a signal obtained by combining the visible light signal after gain adjustment and the non-visible light signal after gain adjustment at a prescribed ratio.

* * * * *